United States Patent
Saygili et al.

(10) Patent No.: US 12,310,421 B2
(45) Date of Patent: May 27, 2025

(54) CLEANING TOOL FOR HEATING ELEMENT WITH GEARS

(71) Applicant: PHILIP MORRIS PRODUCTS S.A., Neuchatel (CH)

(72) Inventors: Ali Murat Saygili, Lausanne (CH); Fabien Duc, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 811 days.

(21) Appl. No.: 17/251,401

(22) PCT Filed: Jul. 17, 2019

(86) PCT No.: PCT/EP2019/069207
§ 371 (c)(1),
(2) Date: Dec. 11, 2020

(87) PCT Pub. No.: WO2020/016281
PCT Pub. Date: Jan. 23, 2020

(65) Prior Publication Data
US 2021/0244104 A1    Aug. 12, 2021

(30) Foreign Application Priority Data
Jul. 17, 2018 (EP) .................................. 18183882

(51) Int. Cl.
*A46B 13/00* (2006.01)
*A24F 40/46* (2020.01)
(Continued)

(52) U.S. Cl.
CPC .............. *A24F 40/85* (2020.01); *A24F 40/46* (2020.01); *A46B 13/02* (2013.01); *A46B 13/08* (2013.01);
(Continued)

(58) Field of Classification Search
CPC . A46B 5/004; A46B 2200/3073; A46B 13/02; F16H 19/04; F16H 1/222; B08B 1/002; A24F 40/46; A24F 40/85
(Continued)

(56) References Cited

U.S. PATENT DOCUMENTS 4,603,448 A * 8/1986 Middleton ............. A61C 17/26
15/23
5,426,806 A    6/1995 Johnson
(Continued)

FOREIGN PATENT DOCUMENTS

| CN | 102264251 | 11/2011 |
| CN | 106828432 | 6/2017 |

(Continued)

OTHER PUBLICATIONS

Office Action issued in Korea for Application No. 10-2020-7036036 dated Feb. 27, 2023 (10 pages). English translation included.
(Continued)

*Primary Examiner* — Katina N. Henson
(74) *Attorney, Agent, or Firm* — Mueting Raasch Group

(57) ABSTRACT

The present invention relates to a cleaning tool configured for cleaning a heating element of an aerosol-generating device. The cleaning tool comprises a mechanical actuator element, one or more cleaning elements, and a driving element. The driving element is configured to transmit a mechanical driving force from the actuator element to the cleaning element. The driving element comprises one or more gears. The present invention relates to an aerosol-generating device together with a cleaning tool and a method for cleaning a heating element of an aerosol-generating device.

15 Claims, 8 Drawing Sheets

Figure 1:
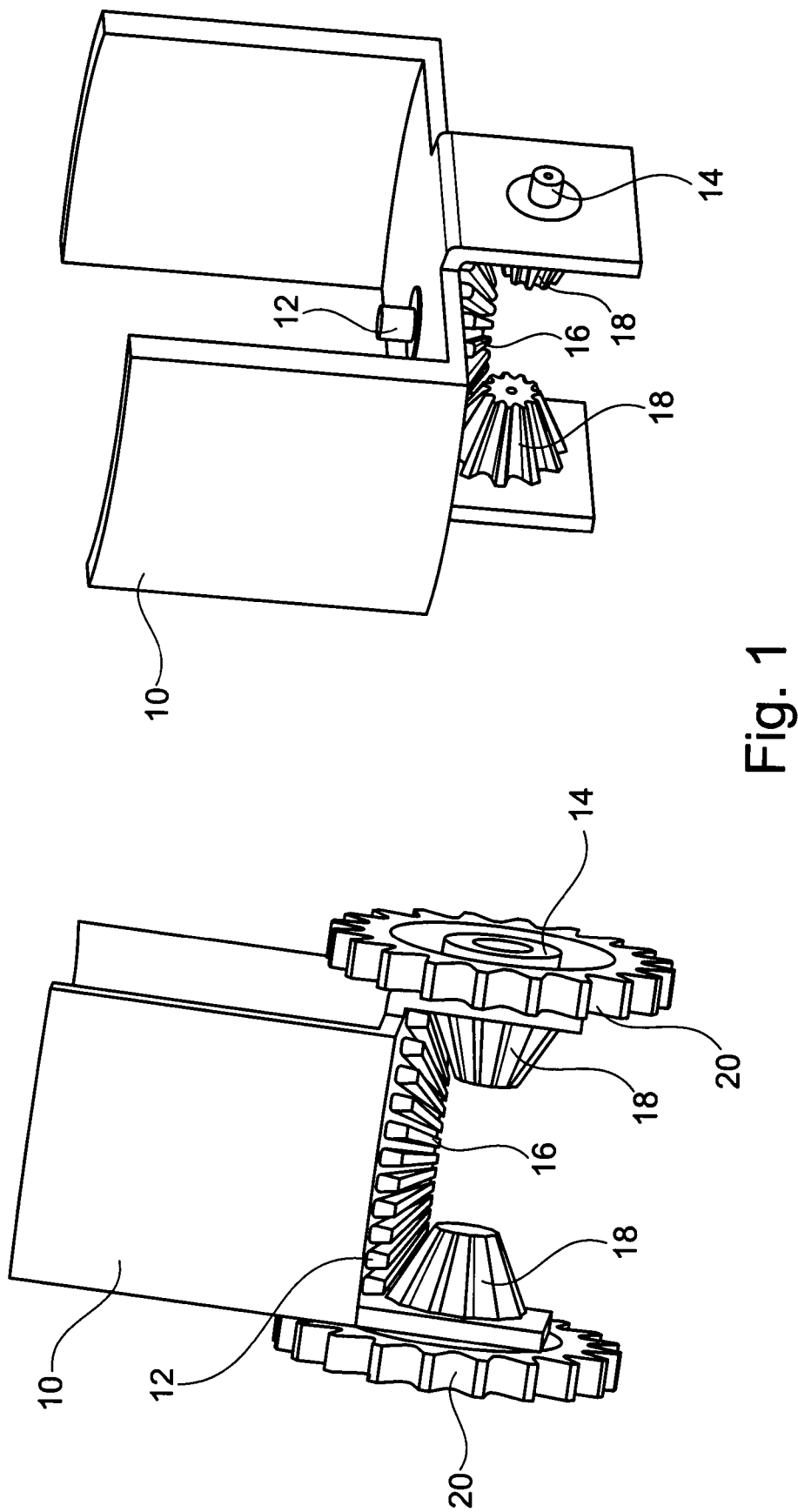

(51) Int. Cl.
  *A24F 40/85* (2020.01)
  *A46B 13/02* (2006.01)
  *A46B 13/08* (2006.01)
  *B08B 1/12* (2024.01)
  *F16H 1/22* (2006.01)
  *F16H 19/04* (2006.01)

(52) U.S. Cl.
  CPC ........ *B08B 1/12* (2024.01); *A46B 2200/3073* (2013.01); *F16H 1/222* (2013.01); *F16H 19/04* (2013.01)

(58) Field of Classification Search
  USPC .......................................................... 15/21.1
  See application file for complete search history.

(56) References Cited

U.S. PATENT DOCUMENTS

| | | | |
|---|---|---|---|
| 5,878,752 | A | 3/1999 | Adams |
| 6,119,700 | A | 9/2000 | Fleischhauer |
| 6,145,514 | A | 11/2000 | Clay |
| 8,689,804 | B2 | 4/2014 | Fernando |
| 8,966,710 | B1 | 3/2015 | Lozano |
| 10,130,121 | B2 | 11/2018 | Plojoux |
| 10,827,782 | B2 | 11/2020 | Fernando |
| 11,000,354 | B2 * | 5/2021 | Choi ................. A61C 17/3418 |

FOREIGN PATENT DOCUMENTS

| | | | |
|---|---|---|---|
| CN | 106858723 | 6/2017 | |
| CN | 207429084 | 6/2018 | |
| EP | 2 201 850 | 6/2010 | |
| GB | 2355649 A * | 5/2001 | ............ A46B 13/02 |
| GB | 2 421 174 | 6/2006 | |
| JP | 2007-159630 | 6/2007 | |
| JP | 2012-513750 | 6/2012 | |
| JP | 2018191550 | 12/2018 | |
| KR | 2002-0036809 | 5/2002 | |
| KR | 2011-0096548 | 8/2011 | |
| KR | 10-1185217 | 9/2012 | |
| KR | 10-1700577 | 1/2017 | |
| RU | 2292825 | 2/2007 | |
| WO | WO-03000090 A1 * | 1/2003 | ............ A61C 17/24 |

OTHER PUBLICATIONS

Office Action issued in Japan for Application No. 2020-571446 dated Dec. 21, 2021 (6 pages). English translation included.
Office Action issued in China for Application No. 201980040503.2 dated Feb. 1, 2023 (12 pages). English translation included.
Office Action issued in China for Application No. 201980040503.2 dated Nov. 3, 2021 (8 pages). English translation included.
Office Action issued in Russia for Application No. 2020142541/03 dated Jul. 21, 2021 (6 pages). English translation included.
Search Report and Written Opinion for PCT/EP2019/069207 dated Oct. 10, 2019 (17 pages).

* cited by examiner

CLEANING TOOL FOR HEATING ELEMENT WITH GEARS

This application is a U.S. National Stage Application of International Application No. PCT/EP2019/069207 filed Jul. 17, 2019, which was published in English on Jan. 23, 2020 as International Publication No. WO 2020/016281 A1. International Application No. PCT/EP2019/069207 claims priority to European Application No. 18183882.2 filed Jul. 17, 2018.

The invention relates to a cleaning tool configured for cleaning a heating element of an aerosol-generating device. Aerosol-generating devices are known which heat but not burn an aerosol-forming substrate such as tobacco. These devices heat the aerosol-forming substrate to a sufficiently high temperature for creating an aerosol for inhalation by the user.

These aerosol-generating devices typically comprise a heating chamber, wherein a heating element is arranged within the heating chamber. An aerosol-generating article comprising the aerosol-forming substrate may be inserted into the heating chamber and heated by the heating element. Typically, after an aerosol-generating article is depleted, the aerosol-generating article is removed from the heating chamber and a fresh aerosol-generating article is inserted. In some systems, an aerosol-generating article is pushed over the heating element and the heating element consequently penetrates into the aerosol-forming substrate of the aerosol-generating article. During removal and insertion of aerosol-generating articles, unwanted residues may remain in the heating chamber and may stick to the heating element.

Consequently, there is a need for removing unwanted residues from at least the heating element of an aerosol-generating device.

The present invention proposes a cleaning tool configured for cleaning a heating element, such as an elongate heating element, of an aerosol-generating device. The cleaning tool comprises a mechanical actuator element, one or more cleaning elements, and a driving element. The driving element is configured to transmit a mechanical driving force from the actuator element to the cleaning element. Furthermore, the driving element comprises one or more gears.

The driving element is provided for transmitting a driving force to the cleaning elements for cleaning the heating element arranged in the heating chamber of the aerosol-generating device. The driving force may be provided by the user by hand or, for example, by means of an electric motor. The cleaning elements may clean the heating element in a defined manner. Damage to the heating element is prevented in comparison with conventional cleaning tools. Conventional cleaning tools are typically manually operated by the user. Typically, the user directly inserts a conventional cleaning tool into the heating chamber and manually drives or moves the cleaning tool by hand to clean the heating element. In conventional cleaning tools, the user may manually manipulate the tool within the heating chamber however he so wishes. For example the user may exert as much or as little force as they wish, in whichever direction (such as rotationally, laterally or a combination thereof) they wish to move the tool within the heating chamber. The way in which the cleaning elements of the conventional cleaning tool is defined by the user and therefore may vary amongst users. Thus, the user may damage the heating element during a cleaning operation with conventional cleaning tools. The present invention facilitates safe and reliable cleaning of the heating element due to the fact that the cleaning action is defined by actuating the actuator element. In other words, the elements of the cleaning tool are configured so that safe and reliable cleaning of the heating element is facilitated, when the actuator element is actuated.

The actuation of the cleaning tool may be mechanical. The actuation of the cleaning tool may be purely mechanical. The actuator element is preferably mechanical. Preferably, the cleaning tool does not comprise an electronic actuator element. Preferably, the cleaning tool does not comprise electrical components in conjunction with operating the cleaning tool. The cleaning tool preferably does not comprise electronic components. The driving force for activating the cleaning elements is preferably purely mechanical.

A user may actuate the actuator element. The actuator element may be configured for lateral movement along the longitudinal axis of the cleaning tool. The actuator element may be configured for rotational movement around the longitudinal axis of the cleaning tool. The user may apply a torque to the actuator element. The actuator element and the driving element may be configured to transmit the torque towards the cleaning element. The transmitted torque may drive movement of the cleaning element. The cleaning element may rotate around the longitudinal axis of the cleaning tool or around an axis perpendicular to the longitudinal axis of the cleaning tool. Cleaning elements may rotate around longitudinal axes parallel to but offset from the longitudinal axis of the cleaning tool. Lateral or rotational movement of the actuator element may drive rotational movement of the cleaning element. One or more of the actuator, driving and cleaning element may comprise one or more of spur, bevel and worm gear or gears. The gears may be configured to match with each other for transmitting the torque.

The cleaning element may comprise one or more of any of: brushes, foam and microfiber cloth. Brushes, foam or microfiber cloth enable removal of unwanted residues from the heating element. The cleaning element may comprise a head formed of microfiber cloth or foam or both. The head may additionally or alternatively comprise one or more brushes.

The cleaning tool may be configured for additionally cleaning one or more of the inner walls and base of the heating chamber. To this end, the cleaning elements may be configured to not only clean the heating element but also clean the inner walls and base of the heating chamber during operation of the cleaning tool. For facilitating cleaning of the inner walls or the base of the heating chamber, the cleaning elements may have a shape so that the cleaning elements contact the inner walls or base of the heating chamber when the actuator element is actuated.

The cleaning element may be configured rotatable around the longitudinal axis of the cleaning element. The longitudinal axis of the cleaning element is perpendicular to the radial axis of the cleaning element. The cleaning element may have a symmetric shape. The cleaning element may be axisymmetric with respect to the longitudinal axis of the cleaning element.

The cleaning element may have a round plate-like or flat cylindrical shape. The cleaning element may have a first end pointing towards the heating element, when the cleaning tool is inserted into the heating chamber of an aerosol-generating device. Hence, the longitudinal axis of the cleaning element is in this embodiment preferably perpendicular to the longitudinal axis of the heating element, when the cleaning tool has been inserted into the heating chamber. The cleaning element may have a second end opposite to the first and. The cleaning element may have a radial surface.

The brushes are preferably arranged on the first end of the cleaning element pointing towards the heating element, when the cleaning tool is inserted into the heating chamber. This arrangement is beneficial when the cleaning element is arranged as a plate-shaped element. The cleaning element is preferably rotated during cleaning of the heating element. At the same time, the brushes are preferably configured to contact the heating element so that the rotation of the cleaning element facilitates scraping off of residues from the heating element by means of the brushes.

The heating element may also have an elongate cylindrical shape, wherein the longitudinal axis of the heating element is essentially parallel to the longitudinal axis of the heating element, when the cleaning tool is inserted into the heating chamber of the aerosol-generating device. In this embodiment, the brushes are preferably arranged on the radial surface of the cleaning element and not on the first end. In this embodiment, the first end is not pointing towards the heating element. Rather, the radial surface of the cleaning element is in this embodiment pointing towards the heating element. When the cleaning tool is operated, the cleaning element is preferably rotated so that the brushes arranged on the radial surface of the heating element scrape off residues of the heating element. This embodiment utilizes a cleaning element with a similar shape compared to an automatic car wash brush. In this embodiment, the first end of the cleaning element points towards the base of the heating chamber. Further brushes may be arranged on the first end so that the base of the heating chamber is cleaned during operation of the cleaning tool. The heating element may have a diameter so that the tips of the brushes contact the heating element as well as the inner walls of the heating chamber, when the cleaning tool is inserted into the heating chamber. Thus, the rotation of the cleaning elements may result in the tips of the brushes contacting the inner walls of the heating chamber as well as the heating element and thereby cleaning the inner walls of the heating chamber as well as the heating element at the same time.

A single cleaning element may be utilized for facilitating the cleaning action of the heating element. However, preferably at least two cleaning elements are used in the cleaning tool according to the present invention. More than two cleaning elements may be utilized, preferably four cleaning elements. The cleaning elements are preferably arranged at opposite sides of the heating element so that both sides of the heating element are cleaned at the same time during operation of the cleaning tool.

The cleaning tool may be configured to be rotated within the heating chamber of the aerosol-generating device. This embodiment is beneficial when the heating element has a symmetric shape such as a heating pin. Then, rotation of the cleaning tool may facilitate uniform cleaning of all side surfaces of the heating element. In case the heating element is provided as an essentially flat element such as a heating blade, rotation of the cleaning tool within the heating chamber of the aerosol-generating device may be prohibited. When the heating element is a flat element, rotation of the cleaning tool may damage the heating element and is therefore preferably prohibited. In this regard, elements such as a pin or an alignment element or alignment key as described in more detail below may be utilized.

The cleaning element may be configured to clean the whole length of the heating element during operation of the cleaning tool. If beneficial, however, the heating element may be configured to only partially clean the heating element. The cleaning element may have a shape to cover only parts of the heating element, when the cleaning tool has been inserted into the heating chamber. The cleaning element may be configured such that parts of the heating element are cleaned during insertion of the cleaning tool into the heating chamber. The cleaning tool may be operated after insertion into the heating chamber or during insertion into the heating chamber.

The heating tool may further comprise a housing, wherein the driving element and the cleaning element are arranged within the housing. The housing may protect the driving element and the cleaning element from damage. The housing may result in the cleaning tool being aesthetically pleasing, since the working elements such as the driving element and the cleaning element are hidden inside of the housing. The heating tool may comprise a cap for closing the housing part which is inserted first into the heating chamber. The cap may prevent the elements inside of the housing from being damaged or polluted when the cleaning tool is not used. Before usage of the cleaning tool, the cap is removed. The housing may be configured as a residue collector. In this aspect, the housing may be configured such that unwanted residues loosened or scraped off by the cleaning element may be gathered by the housing or fall into the housing. These residues may then be extracted from the heating chamber together with the cleaning tool. The housing may comprise lips or protrusions to facilitate that residues do not fall back into the heating chamber after being loosened by the cleaning element. The housing may comprise at least one residue chamber for collecting residues. When the housing comprises lips or protrusions, these may be configured to guide loosened residues into the residue chamber. The at least one residue chamber may be configured easily cleanable by a user. The residue chamber may comprise a closeable opening which may be configured such that a user may open and clean the residue chamber after extraction of the cleaning tool from the heating chamber. Alternatively or additionally, the housing/residue chamber may be configured to release residues when shaken or turned upside down by a user.

The actuator element may comprise a rotatable knob or rotatable ring. The rotatable knob may have an elongate cylindrical shape. The rotatable knob may comprise indentations, grooves or similar elements for facilitating gripping of the knob. The rotatable knob may be gripped by the user and rotated. The rotation of the rotatable knob may result in this movement being transmitted to the cleaning elements by means of the driving element. Hence, the force applied by the user to the rotatable knob may be transmitted by the driving element to the cleaning element. The driving element thus acts as a force transmitting element. The rotation of the rotatable knob may lead to a rotation of the cleaning element as described above. The rotation of the cleaning element may facilitate removal of unwanted residues from the heating element and potentially also from the inner walls and the base of the heating chamber. The rotatable knob may be configured to be gripped by the user to facilitate insertion of the cleaning tool into the heating chamber of the aerosol-generating device. The rotatable knob may be configured to facilitate removal of the cleaning tool from the heating chamber.

The cleaning element may comprise a spur gear. The spur gear of the cleaning element may be utilized for transmitting movement of the actuator element towards the cleaning element by means of the driving element. The spur gear may be arranged on the second end of the cleaning element. The spur gear of the cleaning element may engage a gear of the actuator element for facilitating transmittal of a driving force from the actuator element to the cleaning element.

The actuator element may comprise a spur gear. This embodiment is particularly beneficial when the cleaning element has the shape of an elongate cylinder and is arranged in parallel to the heating element. In this embodiment, the first end of the cleaning element points towards the base of the heating chamber, the radial surface of the cleaning element points towards the heating elements, and the second end of the cleaning element comprises the spur gear and points towards the actuator element. Preferably, the actuator element also has an elongate cylindrical shape and may comprise a rotatable knob. The part of the actuator element facing the cleaning element may be configured as a spur gear. The spur gear of the actuator element may be configured to engage the spur gear of the cleaning element. An actuating movement, preferably rotation, of the actuator element is transferred to the heating element by means of the engagement of the spur gears of the actuator element and of the cleaning element. More than one cleaning element may be provided in this embodiment. Preferably, each cleaning element comprises a spur gear which is configured to engage the spur gear of the actuator element. Multiple spur gears of multiple cleaning elements may engage a single spur gear of the actuator element. In this embodiment, the longitudinal axis of the actuator element is parallel to the longitudinal axis of the cleaning element.

The actuator element may comprise a bevel gear, wherein the driving element comprises at least one bevel gear and at least one spur gear. This configuration of the actuator element is beneficial when the cleaning element has a plate-like shape. The cleaning element of this embodiment is preferably arranged such that the first end of the cleaning element points towards the heating element arranged in the heating chamber of the aerosol-generating device. The second end of the cleaning element points away from the heating element so that the longitudinal axis of the cleaning element is perpendicular to the longitudinal axis of the heating element. In this embodiment, the driving element comprises a bevel gear and a spur gear, wherein the bevel gear of the driving element is configured to engage the bevel gear of the actuator element, and the spur gear of the driving element is configured to engage the spur gear of the cleaning element. The effect of this arrangement is that an actuating movement, preferably rotation, of the actuator element is transmitted to the cleaning element by means of the driving element. Preferably, the cleaning element is rotated. In this embodiment, the longitudinal axis of the actuator element is perpendicular to the longitudinal axis of the cleaning element.

The actuator element may be configured to enable a linear movement along the longitudinal axis of the actuator element in the direction of the cleaning element. The actuator element may comprise a support configured to engage an opening of the heating chamber. The support may rest against the opening of the heating chamber, while a further part of the actuator element actuated by a user is configured to enable the linear movement of the actuator element in comparison to the above-described rotational movement of the actuator element. Preferably, the linear movement of the actuator element is translated to a rotational movement of the cleaning element by means of the driving element. The actuator element may comprise a spring configured to generate a retaining action. The retaining action may bring the actuator element back to the initial position after each movement of the actuator element. Preferably, the cleaning action of the cleaning tool is in this embodiment realized by pushing the actuator element multiple times against the retaining force of the spring. In this embodiment, the cleaning tool is preferably placed near or partly inside of the heating chamber of the aerosol-generating device and then operated multiple times by pushing the actuator element in the direction of the heating chamber, while the cleaning tool is held in place by the support of the actuator element. After each activation of the actuator element, the spring pushes the actuator element back into its initial position.

The support of the actuator element may comprise a worm gear, wherein the movement element comprises at least one spur gear. The actuator element preferably utilizes a worm gear, when the actuator element is configured for linear movement. In this embodiment, the linear movement of the actuator element is translated to a rotational movement of the cleaning element by means of the worm gear being configured to engage the spur gear of the movement element. The movement element according to this embodiment may comprise a bevel gear configured to engage with a bevel gear of the cleaning element.

The cleaning tool may comprise multiple cleaning elements, wherein the cleaning elements are configured rotatable around a common longitudinal axis of the cleaning elements, and wherein the common longitudinal axis of the cleaning elements is offset with respect to the respective individual longitudinal axes of the individual cleaning elements. According to this arrangement of the cleaning elements, the cleaning elements circle around the heating element so that the outer surface of the heating element is uniformly cleaned during operation of the cleaning tool.

The cleaning tool may further comprise a housing, wherein the housing comprises an alignment element configured to correctly align the cleaning tool during insertion into a heating chamber of an aerosol-generating device. The alignment element may particularly be provided if the heating element to be cleaned has an essentially flat shape. In this case, correctly aligning the cleaning tool during insertion into the heating chamber may be beneficial for cleaning the heating element and at the same time preventing damaging the heating element. The alignment element may have the shape of a groove extending parallel to the longitudinal axis of the housing and being arranged on the outer surface of the housing. The alignment element may have the shape of a nut extending parallel to the longitudinal axis of the housing and being arranged on the outer surface of the housing. Preferably, a correspondingly shaped element is formed on the inner wall of the heating chamber to engage with the alignment element of the cleaning tool. Once the cleaning tool is inserted into the heating chamber of the aerosol-generating device, the alignment element being engaged with the correspondingly shaped element of the aerosol-generating device prevents rotation of the cleaning tool within the heating chamber of the aerosol-generating device. Preventing rotation of the cleaning tool is particularly beneficial if the heating element has a flat shape or rotation of the cleaning tool may otherwise damage the heating element.

The cleaning tool may have a longitudinal length of between 10 mm to 50 mm, preferably 20 mm to 40 mm and more preferably of 30 mm. The cleaning tool may have a diameter of between 5 mm to 20 mm, preferably 8 mm to 15 mm and more preferably of 12 mm.

The actuator element may comprise a battery, an electric motor and an activation button. The actuator element may thus be provided for automatically facilitating a cleaning action if a user presses the activation button. Instead of an activation button, the actuator element may comprise a communication interface so that the actuator element may be activated by means of an external device such as a smartphone or smartwatch.

The present invention also relates to an aerosol-generating device and a cleaning tool as described above. The aerosol-generating device comprises a heating chamber and a heating element, wherein the heating element is arranged in the heating chamber. The cleaning tool is configured to be inserted into the heating chamber and configured to clean at least the heating element by actuating the actuator element.

The heating element may be centrally aligned in the heating chamber. The heating element may be a heating pin or heating blade. The heating element may be a resistive heater. The heating chamber may have a cylindrical shape.

The invention also relates to a method for cleaning a heating element of an aerosol-generating device by means of a cleaning tool, the method comprising the following steps:
  i) providing a cleaning tool comprising an actuator element, one or more cleaning elements and a movement element configured to transmit a driving force from the actuator element to the cleaning element, wherein the movement element comprises one or more gears,
  ii) inserting the cleaning tool into a heating chamber of the aerosol-generating device, and
  iii) actuating the actuator element for cleaning the heating element in the heating chamber.

Figure 2:
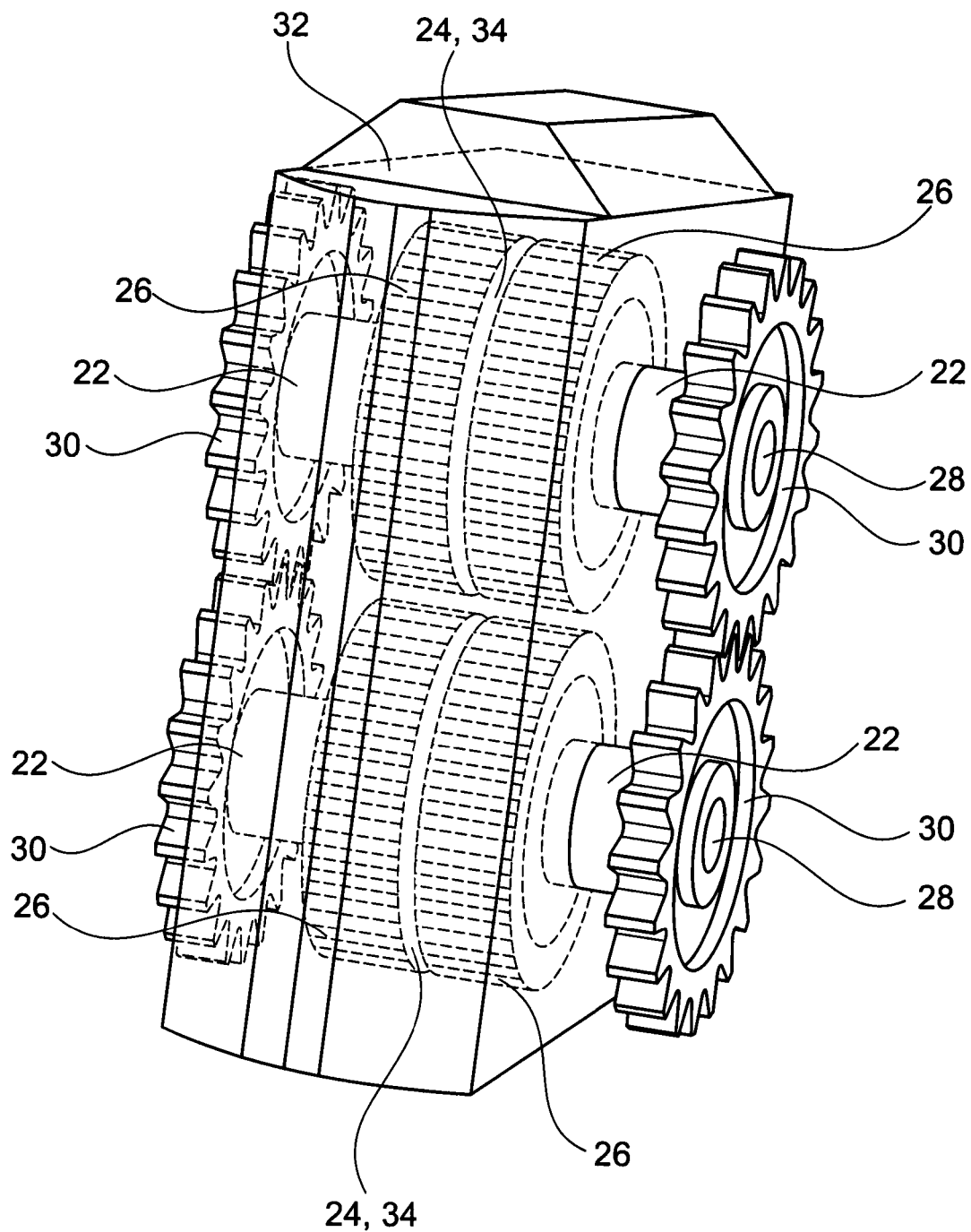
Figure 3:
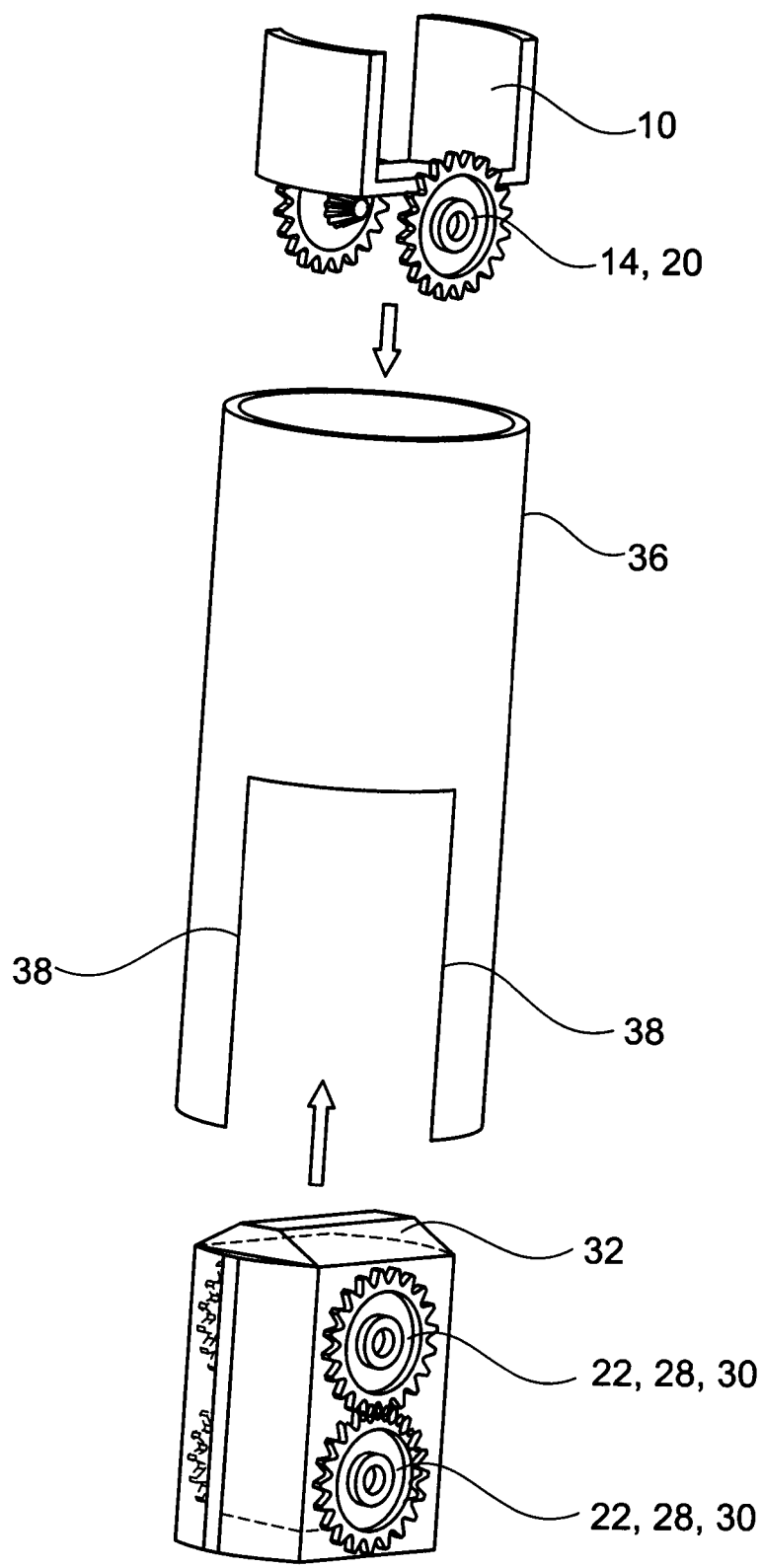
Figure 4:
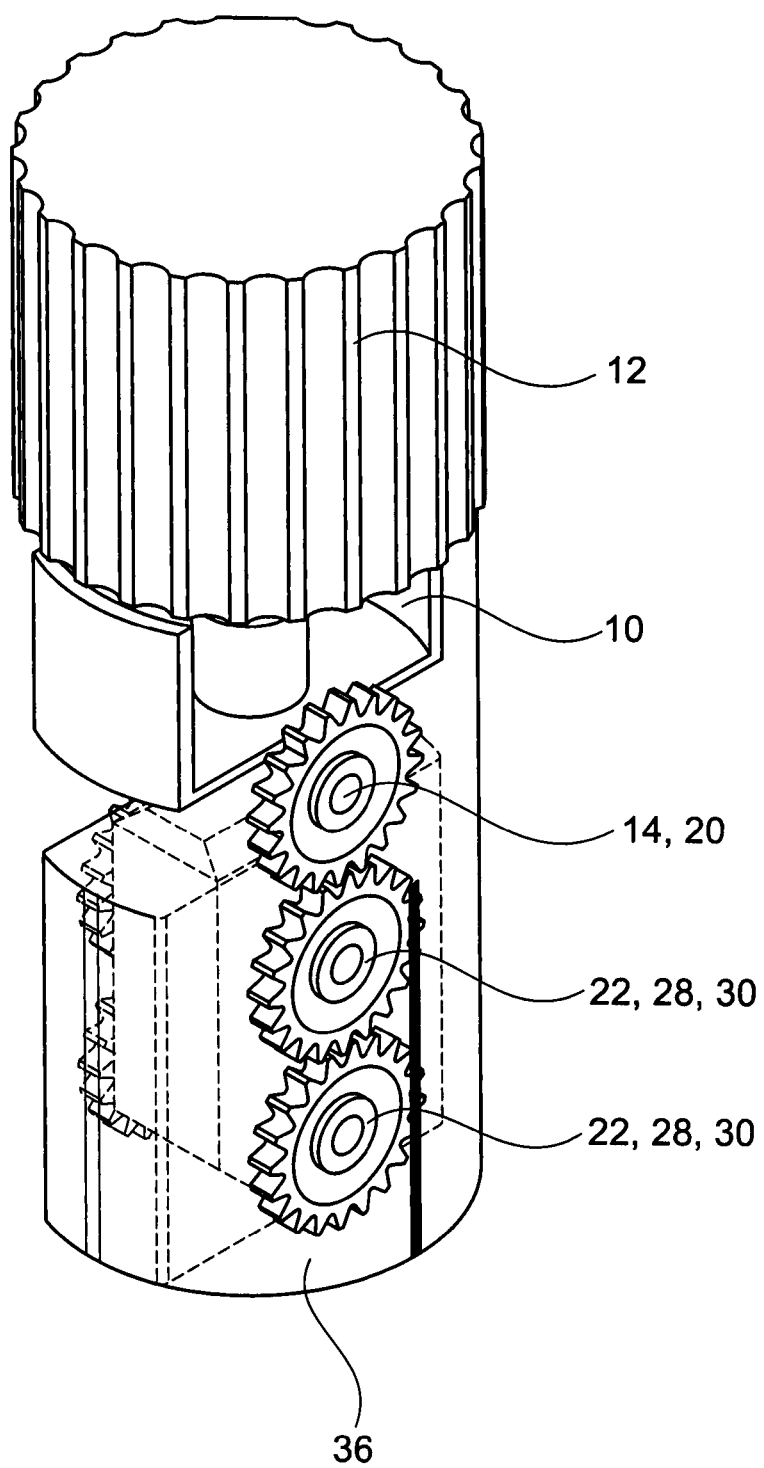
Figure 5:
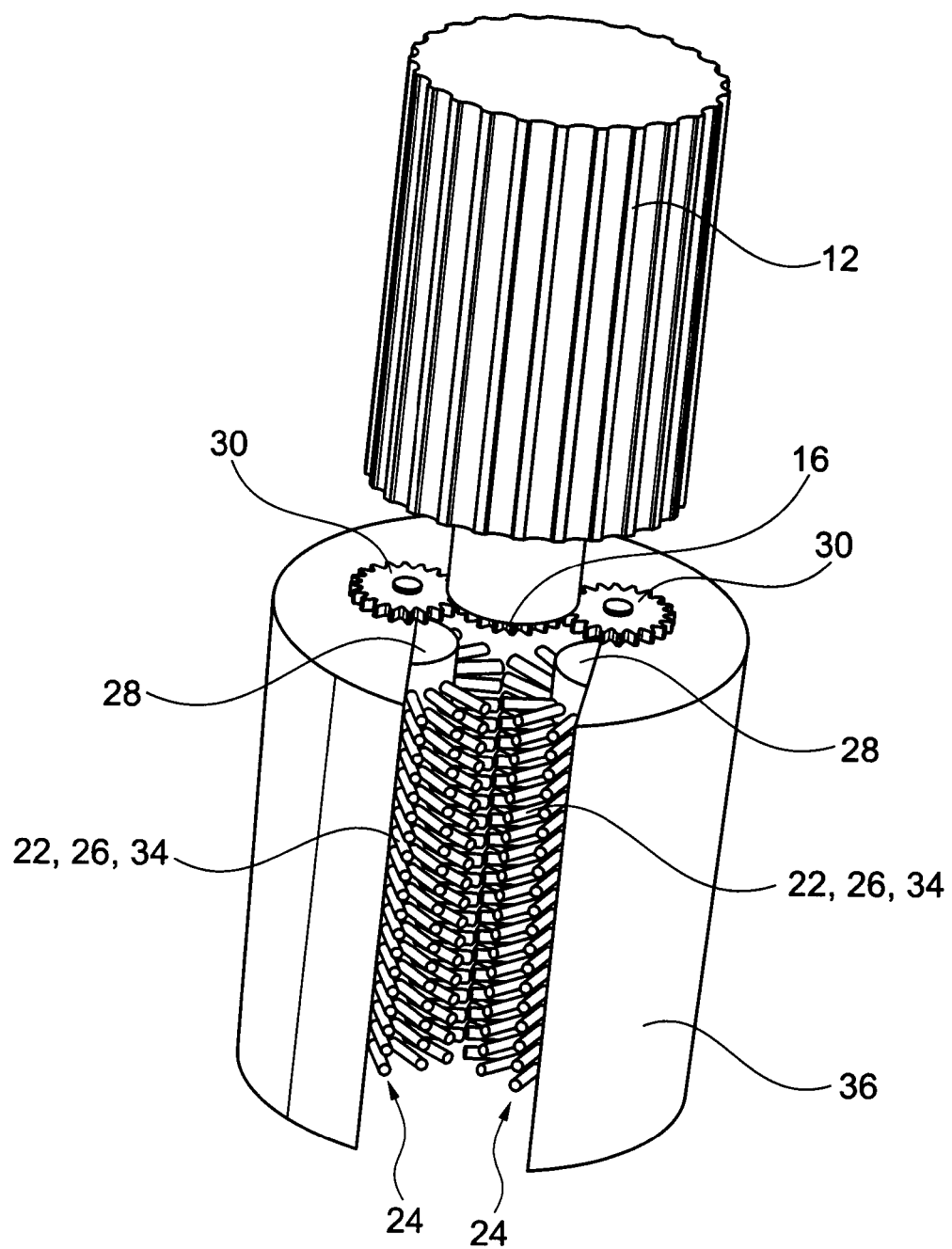
Figure 6:
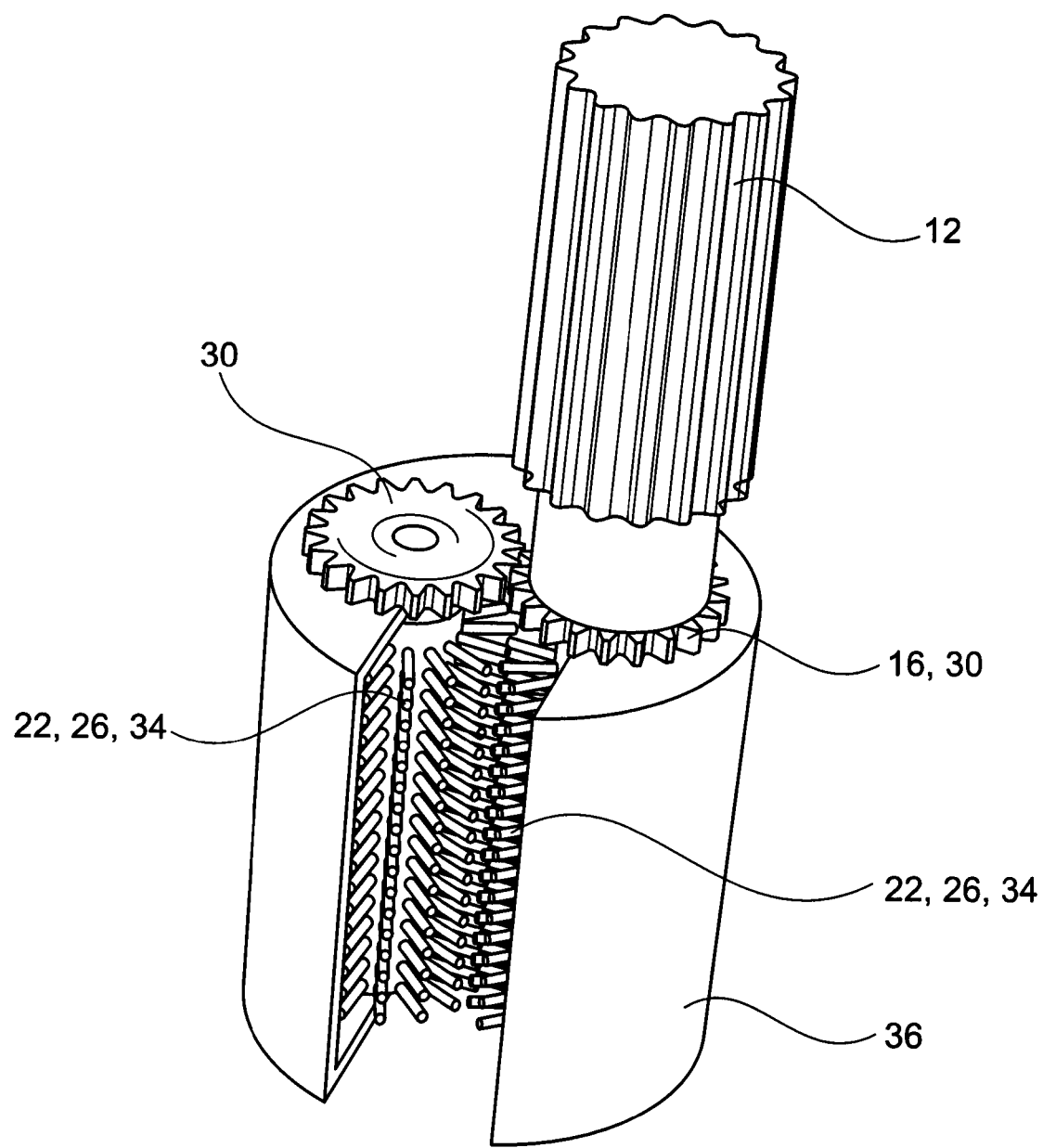
Figure 7:
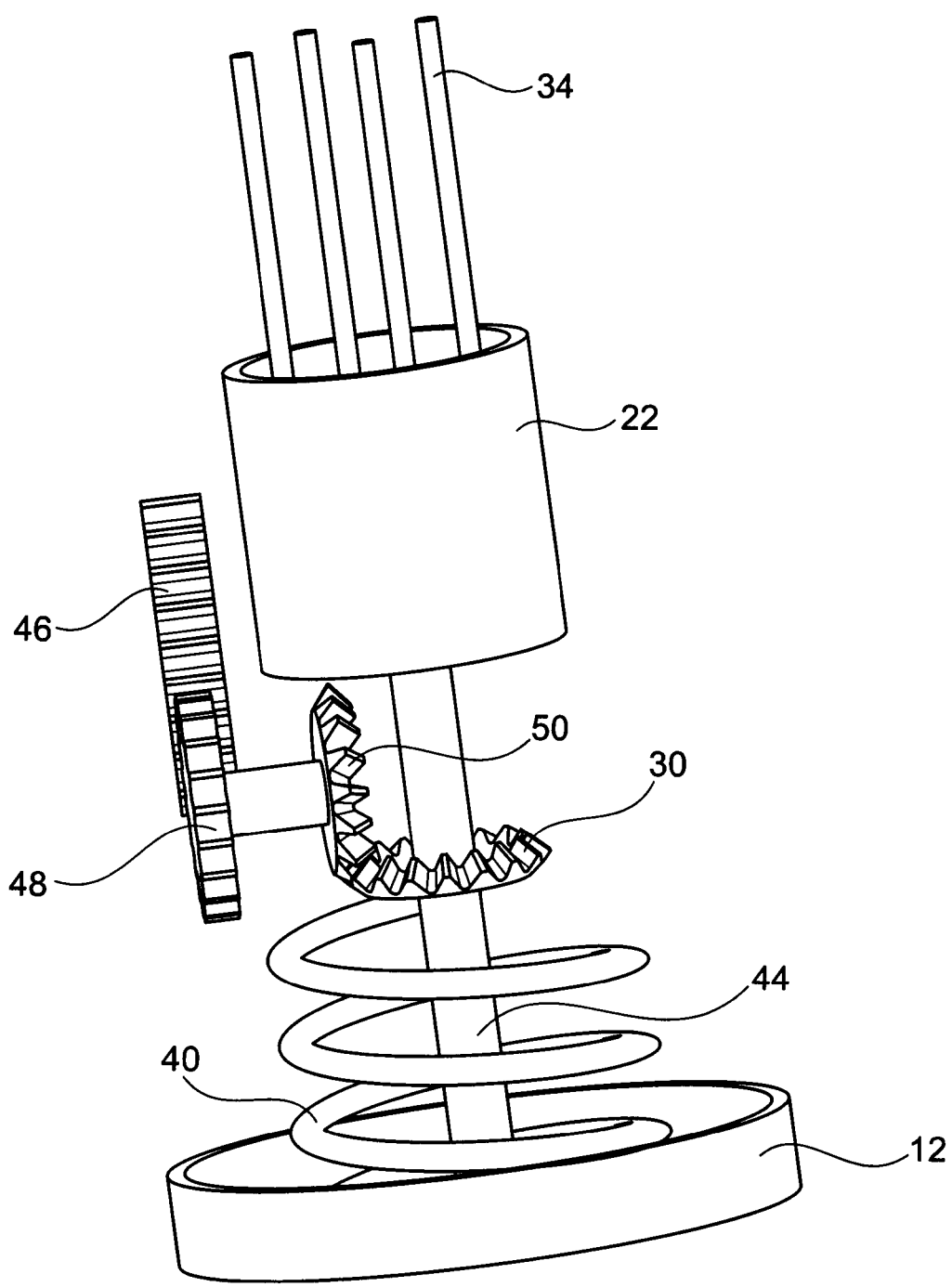
Figure 8:
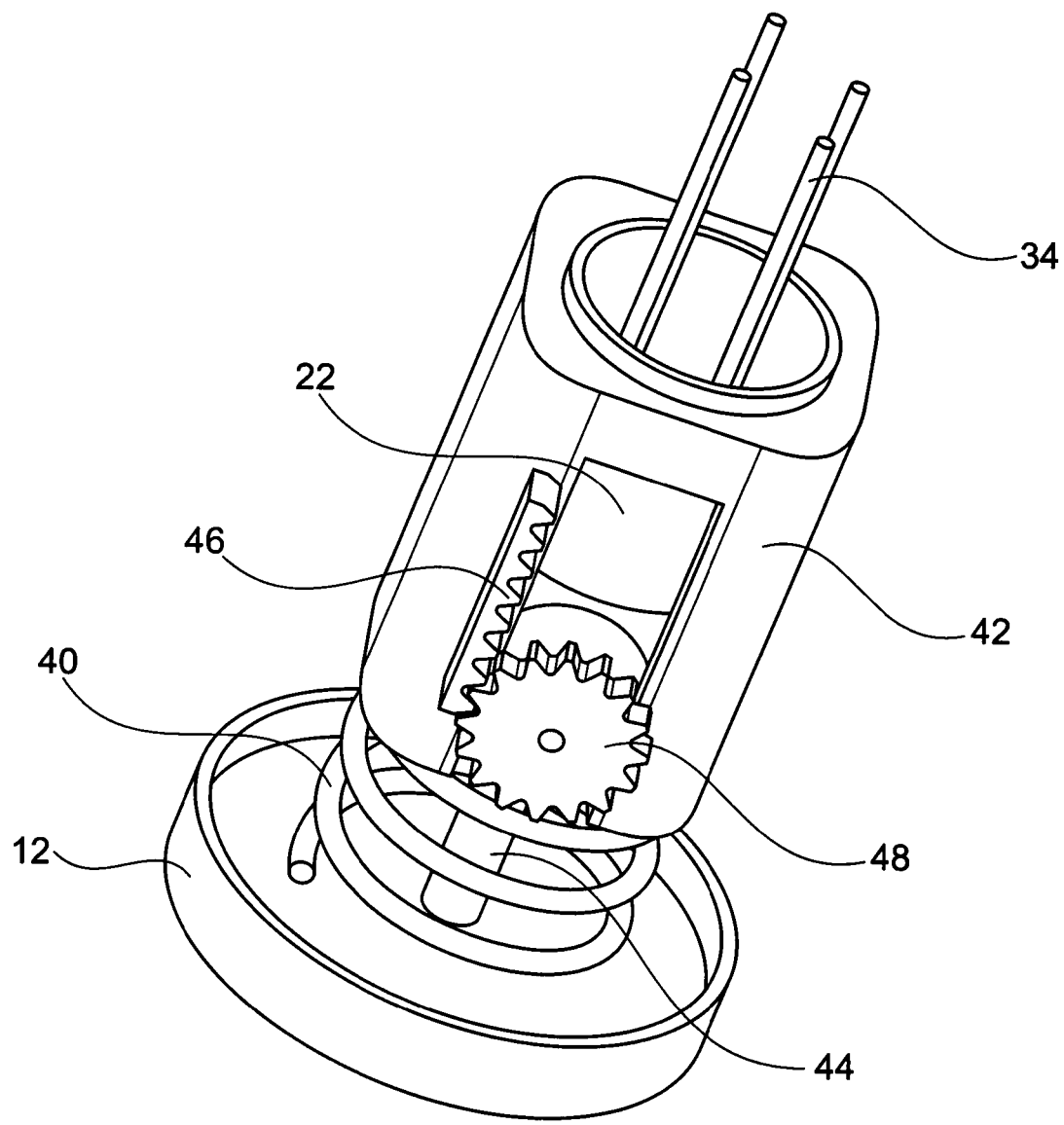

The invention will be described in more detail in the following with reference to the accompanying drawings, which show in:

FIG. 1: a mounting element, an actuator element and a driving element of a cleaning tool according to the present invention;

FIG. 2: cleaning elements of the cleaning tool according to the present invention;

FIG. 3: a housing of the cleaning tool according to the present invention;

FIG. 4: the working components of the cleaning tool according to the present invention assemble together;

FIG. 5: a configuration of a cleaning tool according to the present invention according to an embodiment;

FIG. 6: a configuration of a cleaning tool according to the present invention according to an embodiment;

FIG. 7: a configuration of a cleaning tool according to the present invention according to an embodiment; and FIG. 8: a further illustration of the cleaning tool according to the present invention according to the embodiment of FIG. 7;

FIG. 1 shows parts of a cleaning tool according to the present invention. In more detail, FIG. 1 shows a mounting element 10 for mounting an actuator element 12 and a movement element 14.

FIG. 1 shows a gear of the actuator element 12. In the embodiment shown in FIG. 1, the gear of the actuator element 12 is configured as a bevel gear 16. In the embodiments depicted in FIGS. 5 and 6, the gear of the actuator element 12 is configured as a spur gear. The bevel gear 16 of the actuator element 12 is arranged to engage with a gear 18 of the driving element 14, which in some embodiments, such as the embodiment shown in FIG. 1, is a bevel gear. The driving element 14 according to an embodiment of the present invention depicted in FIG. 1 comprises a spur gear 20 opposite to the bevel gear 18. As depicted in FIG. 1, the driving element 14 preferably comprises two separate gears opposite to each other, wherein each gear comprises a bevel gear 18 and a spur gear 20. The right hand part of FIG. 1 shows the bevel gears 18 of the driving element 14 in engagement with the bevel gear 16 of the actuator element 12. In the left hand part of FIG. 1, the spur gears 20 of the driving element 14 are additionally depicted arranged opposite to the bevel gears 18 of the driving element 14. The spur gears 20 of the driving element 14 may be connected to the bevel gears 18 of the driving element 14 with respective shafts. Between a spur gear 20 and a bevel gear 18 of the driving element 14, a gap may be provided for mounting the driving element 14 on the mounting element 10. The actuator element 12 is also mounted on the mounting element 10. In the embodiment shown in FIG. 1, a gap is provided between the bevel gear 16 of the actuator element 12 and a rotatable knob which the actuator element 12 may comprise and which is exemplarily depicted in FIGS. 4, 5 and 6. The actuator element 12 may be mounted to the mounting element 10 in this gap. The actuator element 12 and the driving element 14 are thus mounted on the mounting element 10.

FIG. 2 shows four cleaning elements 22 according to an embodiment. The mounting element 10 functions as a bracket for connecting the driving element 14 to the cleaning elements 22. By means of the two pairs of spur gears 20 and bevel gears 18 of the driving element 14, all four cleaning elements 22 may be moved at the same time by moving the actuator element 12. In the embodiment shown in FIG. 2, each cleaning element 22 has an essentially plate-like shape and comprises a first end 24 arranged to be facing a heating element, when the cleaning tool is inserted into the heating chamber of an aerosol-generating device. Each cleaning element 22 also comprises a radial surface 26 and a second end 28 opposite the first end 24. At the second end 28, each cleaning element 22 comprises a spur gear 30. In some embodiments, the cleaning element 22 comprises multiple spur gears 30.

FIG. 2 also shows an inner housing 32 which encompasses the cleaning elements 22. The inner housing 32 is provided for preventing residues which are scraped off of the heating element by the cleaning elements 22 from polluting the spur gears 30 or other components of the cleaning tool. The inner housing 32 may be configured for collecting loosened residues for extraction of these residues from the heating chamber. The inner housing 32 may comprise at least one guiding element for guiding loosened residues into the inner housing 32 and for preventing the residues for falling into the heating chamber.

As depicted in FIG. 2, each cleaning element 22 comprises multiple brushes 34 at the respective first ends 24 arranged to be pointing towards a heating element to be cleaned when the cleaning tool is received in the heating chamber. Each cleaning element 22 as shown in FIG. 2 comprises an axis. During operation, the brushes 34 rotate around the respective axes of the cleaning elements 22, which axes are perpendicular to a longitudinal axis of the heating element.

FIG. 3 shows a housing 36 of the cleaning tool for surrounding the working components, i.e. the actuator element 12, the movement element 14 and the cleaning elements 22. The housing 36 may be configured, alternatively or in addition to the inner housing 32, for holding loosened residues for extraction of the residues together with the cleaning tool after a cleaning operation. In some embodiments, the housing 36 may only partially surround the working elements 12, 14, 22, or may not surround all of the working elements 12, 14, 22. For example in some embodiments, a portion of the cleaning elements 22 may protrude or extend beyond the housing 36 such that the cleaning elements 22 are at least partially exposed. In some embodiments, for example those shown in FIGS. 5 and 6, at least a portion of the gear 16 of the actuator element 14 may be exposed outside the housing 36. The housing 36 is provided for protecting the working components of the cleaning tool from damage and also for increasing the aesthetics of the cleaning tool. The housing 36 may have an outer diameter such that the housing 36 may be inserted into the heating chamber of the aerosol-generating device. Preferably, the housing 36 has a diameter so that the housing 36 is a close fit with the heating chamber and unwanted residues sticking to the inner walls of the heating chamber are scraped off of the inner walls of the heating chamber during insertion of the housing 36 into the heating chamber of the aerosol-generating device. The housing 36 may also comprise an alignment element 38. The alignment element 38 is arranged on the outer surface of the housing 36. The cleaning elements 22 are, by means of the alignment element 38, automatically correctly aligned with respect to the heating element to be cleaned, when the cleaning tool is inserted into the heating chamber of the aerosol-generating device. The alignment element 38 preferably comprises a longitudinal extending groove or nut.

Operation of the heating element may be prevented during usage of the cleaning tool. A detection element such as a sensor or poka yoke may be arranged on the outer surface of the housing 36 such that the aerosol-generating device detects that the cleaning tool has been inserted into the heating chamber. As a consequence, the operation of the heating element may be prevented by a controller of the aerosol-generating device. The inner walls of the heating chamber may comprise a corresponding detection element to interact with the detection element of the cleaning tool.

FIG. 4 shows the components of the cleaning tool shown in FIGS. 1 to 3 assembled together. When assembled together, the bevel gear 16 of the actuator element 12 engages the bevel gear 18 of the driving element 14 as shown in FIG. 1. The actuator element 12 comprises a rotatable knob. The spur gear 20 of the movement element 14 engages the spur gear 30 of the cleaning element 22. If multiple cleaning elements 22 are provided, as shown in FIGS. 2 and 4, the spur gears 30 of cleaning elements 22, which are not directly engaging the movement element 14, engage the spur gears 30 of cleaning elements 22 which are positioned nearer the movement element 14. A reciprocal movement of the cleaning elements 22 is thus facilitated which may further enhance the cleaning of the heating element by the cleaning tool.

FIG. 5 shows an embodiment, in which the cleaning elements 22 have an elongate cylindrical shape. In this embodiment, the brushes 34 are arranged on the radial surface 26 of the cleaning elements 22. The first ends 24 of the cleaning elements 22 point towards the base of the heating chamber, when the cleaning tool is inserted into the heating chamber. The second ends 28 of the cleaning elements 22 comprise a spur gear 30 for direct engagement of a spur gear 16 of the actuator element 12. In the embodiment shown in FIG. 5, two cleaning elements 22 are provided. However, only one or more than two cleaning elements 22 may be provided. In this regard, the cleaning elements 22 are provided around the heating element so that the heating element is cleaned from all sides by rotation of the cleaning elements 22. For rotating the cleaning elements 22, the actuator element 12 comprising a rotatable knob is rotated. This has the effect that all of the cleaning elements 22 are rotated at the same time similar to brushes of automatic car wash lines. In the embodiments shown in FIGS. 5 and 6, the cleaning elements 22 rotation around longitudinal axes parallel to but offset from the longitudinal axis of the heating element.

FIG. 6 shows a further embodiment, in which a spur gear 16 of the actuator element 12 at the same time functions as a spur gear 30 of a cleaning element 22. In the embodiment shown in FIG. 6, two cleaning elements 22 are provided, wherein the first cleaning element 22 comprises a first spur gear 30 at a second end 28 of the cleaning element 22, and the second cleaning element 22 comprises a second spur gear 30, which second spur gear 30 is also the spur gear 16 of the actuator element 12. The spur gear 16, 30 of the actuator element 12 and of the second cleaning element 22 engages the spur gear 30 of the first cleaning element 22 so that rotation of the actuator element 12 will have the effect of rotation of both of the cleaning elements 22.

FIG. 7 shows a further embodiment in which the actuator element 12 is configured for linear movement in comparison to the rotational movement described in the embodiments shown in FIGS. 1 to 6. In the embodiment of FIG. 7, a spring 40 is provided as part of the actuator element 12. As can be seen in FIG. 8, the spring 40 is connected with a support 42. The support 42 has a shape so that the support 42 may rest against the opening of a heating chamber of an aerosol-generating device, while the cleaning elements 22 may reach into the heating chamber. The actuator element 12 of the embodiment shown in FIGS. 7 and 8 has a shaft 44 configured to slide along the longitudinal axis of the cleaning tool and with respect to the cleaning elements 22 and the movement element 14. The support 42 comprises a worm gear 46, which engages a spur gear 48 of the movement element 14. The movement element 14 comprises a bevel gear 50, which engages a bevel gear 30 of the cleaning element 22. The cleaning element 22 comprises multiple brushes 34 which are rotated as a consequence of the linear movement of the actuator element 12. In the embodiment shown in FIGS. 7 and 8, the brushes 34 of the cleaning element 22 rotate around a longitudinal axis of the cleaning tool which is coincident with the longitudinal axis of the heating element when the cleaning tool is inserted in the heating chamber. Hence, the brushes 34 of the cleaning element 22 may be rotated for cleaning the heating element by the linear movement of the actuator element 12. Spring 40 is provided for creating a retaining force which brings actuator element 12 back into its initial position after actuation of actuator elements 12. Preferably, the cleaning tool as shown in FIGS. 7 and 8 is positioned against an opening of the heating chamber. Subsequently, actuator element 12 is repeatedly pushed in the direction of the heating chamber thereby creating a rotation of brushes 34 of cleaning element 22. After cleaning of the heating element and preferably the inner walls and base of the heating chamber of the aerosol-generating device, the cleaning tool is removed. During removal, loosened residues are preferably extracted from the heating chamber together with the cleaning tool. The loosened residues may be contained in the inner housing 32 or the housing 36.

The invention claimed is:

1. Cleaning tool configured for cleaning a heating element of an aerosol-generating device, the cleaning tool comprising:
   a mechanical actuator element;
   one or more cleaning elements, and
   a driving element configured to transmit a mechanical driving force from the mechanical actuator element to the cleaning element, wherein the driving element comprises one or more gears, wherein the actuator element is configured to be actuated manually by a user, and wherein the actuator element is configured for lateral movement along a longitudinal axis of the cleaning tool or rotational movement around the longitudinal axis of the cleaning tool, wherein the cleaning element comprises a spur gear, and wherein the actuator element comprises a spur gear matched with the spur gear of the cleaning element.

2. The cleaning tool according to claim 1, wherein the cleaning element comprises one or more of any of brushes, microfiber cloth and foam.

3. The cleaning tool according to claim 1, wherein the cleaning element is configured rotatable around the longitudinal axis of the cleaning element.

4. The cleaning tool according to claim 1, wherein the cleaning tool further comprises a housing.

5. The cleaning tool according to claim 4, wherein the driving element and the cleaning element are arranged substantially within the housing.

6. The cleaning tool according to claim 4, wherein the housing comprises an alignment element configured to align the cleaning tool during insertion into a heating chamber of an aerosol-generating device.

7. The cleaning tool according to claim 1, wherein the actuator element comprises a bevel gear, and wherein the driving element comprises at least one bevel gear and at least one spur gear.

8. The cleaning tool according to claim 7, wherein the cleaning tool comprises multiple cleaning elements, wherein the cleaning elements are configured rotatable around a common longitudinal axis of the cleaning elements, and wherein the common longitudinal axis of the cleaning elements is offset with respect to the respective individual longitudinal axes of the individual cleaning elements.

9. The cleaning tool according to claim 1, wherein the actuator element is configured to move linearly along a longitudinal length of the cleaning tool and relative to the cleaning element.

10. The cleaning tool according to claim 9, wherein the linear movement of the actuator element is a reciprocating linear movement for transmitting a torque to the cleaning element.

11. The cleaning tool according to claim 1, wherein the actuator element comprises a worm gear, and wherein the driving element comprises at least one spur gear.

12. The cleaning tool according to claim 1, wherein the cleaning tool has a longitudinal length of between 10 mm to 50 mm, and wherein the cleaning tool has a diameter of between 5 mm to 20 mm.

13. A system comprising:
an aerosol-generating device, and
the cleaning according to claim 1,
wherein the aerosol-generating device comprises a heating chamber and a heating element, wherein the heating element is arranged in the heating chamber, and wherein the cleaning tool is configured to be inserted into the heating chamber and configured to clean at least the heating element by actuating the actuator element.

14. Cleaning tool configured for cleaning a heating element of an aerosol-generating device, the cleaning tool comprising:
a mechanical actuator element; and
one or more cleaning elements, wherein the actuator element is configured to be actuated manually by a user, and wherein the actuator element is configured for lateral movement along a longitudinal axis of the cleaning tool or rotational movement around the longitudinal axis of the cleaning tool, wherein the cleaning element comprises a spur gear, and wherein the actuator element comprises a spur gear matched with the spur gear of the cleaning element.

15. Cleaning tool configured for cleaning a heating element of an aerosol-generating device, the cleaning tool comprising:
a mechanical actuator element;
one or more cleaning elements, and
a driving element configured to transmit a mechanical driving force from the mechanical actuator element to the cleaning element, the driving element comprising a first spur gear,
wherein the actuator element is configured to be actuated manually by a user, and wherein the actuator element is configured for lateral movement along a longitudinal axis of the cleaning tool or rotational movement around the longitudinal axis of the cleaning tool, wherein the actuator element is operatively coupled to the first spur gear, and wherein the cleaning element comprises a second spur gear matched with the first spur gear.

* * * * *